US012613038B2

(12) United States Patent
Han et al.

(10) Patent No.: US 12,613,038 B2
(45) Date of Patent: Apr. 28, 2026

(54) COOKING APPARATUS AND CONTROLLING METHOD THEREOF

(71) Applicant: Samsung Electronics Co., Ltd., Suwon-si (KR)

(72) Inventors: Seongjoo Han, Suwon-si (KR); Keehwan Ka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 707 days.

(21) Appl. No.: 17/994,212

(22) Filed: Nov. 25, 2022

(65) Prior Publication Data

US 2023/0089725 A1 Mar. 23, 2023

Related U.S. Application Data

(63) Continuation of application No. PCT/KR2022/010025, filed on Jul. 11, 2022.

(30) Foreign Application Priority Data

Jul. 13, 2021 (KR) ........................ 10-2021-0091882

(51) Int. Cl.
*F24C 7/08* (2006.01)
*G06V 10/82* (2022.01)
*G06V 20/68* (2022.01)

(52) U.S. Cl.
CPC .............. *F24C 7/086* (2013.01); *F24C 7/085* (2013.01); *G06V 10/82* (2022.01); *G06V 20/68* (2022.01)

(58) Field of Classification Search
CPC ........... G06V 10/82; G06V 20/68; F24C 7/08; F24C 7/089; F24C 7/085
See application file for complete search history.

(56) References Cited

U.S. PATENT DOCUMENTS 9,226,093 B2 12/2015 Park et al.
10,398,260 B2 9/2019 Park et al.
(Continued)

FOREIGN PATENT DOCUMENTS

JP 4165552 B2 10/2008
JP WO2018-235702 A1 4/2020
(Continued)

OTHER PUBLICATIONS

Korean Office Action dated Jan. 7, 2026, issued in Korean Application No. 10-2021-0091882.

*Primary Examiner* — Thien S Tran
(74) *Attorney, Agent, or Firm* — Jefferson IP Law, LLP

(57) ABSTRACT

A cooking apparatus is provided. The cooking apparatus includes a camera configured to obtain a cooking image by capturing a food product, a sensor configured to detect information associated with cooking while the food product is being captured, a display, a memory, and a processor configured to store information on a cooking history in the memory by matching the cooking image obtained by the camera and information associated with the cooking which is detected through the sensor, control the display to provide a user interface (UI) capable of setting a degree of cooking based on the stored cooking history, obtain control information of the cooking apparatus based on information associated with the cooking which is matched to the cooking image selected on the provided UI, and control the cooking apparatus to perform cooking based on the obtained control information of the cooking apparatus.

16 Claims, 10 Drawing Sheets

(56)    References Cited

U.S. PATENT DOCUMENTS

| | | | |
|---|---|---|---|
| 10,555,633 B2 | 2/2020 | Choudhary | |
| 11,229,311 B2 | 1/2022 | Diao et al. | |
| 2016/0327279 A1 | 11/2016 | Bhogal et al. | |
| 2018/0152995 A1* | 5/2018 | Noda | H05B 6/6447 |
| 2020/0019861 A1 | 1/2020 | Jeong | |
| 2021/0182667 A1 | 6/2021 | Maeng | |
| 2021/0227650 A1 | 7/2021 | Areljung et al. | |
| 2021/0228022 A1* | 7/2021 | Liu | A47J 36/321 |
| 2021/0401223 A1* | 12/2021 | Han | G06T 7/90 |
| 2022/0051458 A1 | 2/2022 | Yeon et al. | |
| 2022/0273136 A1 | 9/2022 | Du | |
| 2022/0273138 A1 | 9/2022 | Du | |
| 2022/0287498 A1 | 9/2022 | Hua | |

FOREIGN PATENT DOCUMENTS

| | | | | |
|---|---|---|---|---|
| KR | 10-2019-0105531 A | 9/2019 | | |
| KR | 10-2078006 B1 | 2/2020 | | |
| KR | 10-2020-0030955 A | 3/2020 | | |
| KR | 10-2097638 B1 | 4/2020 | | |
| KR | 10-2020-0092380 A | 8/2020 | | |
| KR | 10-2021-0029722 A | 3/2021 | | |
| KR | 10-2021-0074648 A | 6/2021 | | |
| WO | WO-2020077501 A1 * | 4/2020 | | A47J 36/321 |
| WO | WO-2021040095 A1 * | 3/2021 | | F24C 7/085 |
| WO | 2021/098427 A1 | 5/2021 | | |

* cited by examiner

100

COOKING APPARATUS AND CONTROLLING METHOD THEREOF

CROSS-REFERENCE TO RELATED APPLICATION(S)

This application is a continuation application, claiming priority under § 365(c), of an International application No. PCT/KR2022/010025, filed on Jul. 11, 2022, which is based on and claims the benefit of a Korean patent application number 10-2021-0091882, filed on Jul. 13, 2021, in the Korean Intellectual Property Office, the disclosure of which is incorporated by reference herein in its entirety.

BACKGROUND

1. Field

The disclosure relates to a cooking apparatus and a controlling method thereof. More particularly, the disclosure relates to a cooking apparatus performing cooking by using past cooking results of the cooking apparatus and a controlling method thereof.

2. Description of the Related Art

A cooking apparatus may perform various cooking functions such as grilling, frying, boiling, and the like. Generally, cooking apparatuses of the related art have defined a degree of cooking which is predetermined for each food product, and have provided a predefined degree of cooking to a user.

When the user selects a desired degree from among the provided degree of cooking and starts cooking, the cooking apparatus performs cooking according to a predetermined standard to reach the corresponding degree of cooking.

However, the cooking apparatuses of the related art provide a degree of cooking which is defined from a universal point of view, and there is the problem of not being able to provide a degree of cooking desired by each user satisfying the various preferences for each user.

Accordingly, after performing cooking according to the degree of cooking set by the user and after the user checks the finished cooked product, there is the problem of performing additional cooking if the degree of cooking is lacking or not using the degree of cooking any longer if the degree of cooking is excessive.

In addition, even if the user performs cooking by setting the cooking apparatus accordingly to the desired degree of cooking, there is the inconvenience of having to perform cooking by resetting the cooking apparatus separately at the next cooking, and there is the problem of not knowing a setting value for the cooking apparatus to obtain a same degree of cooking if a state of a food product is different from the previous food product or if it is a different food product.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cooking apparatus capable of capturing an image of which is previously cooked by a user, and then cooking a food product to the same degree of cooking by simply selecting the image of which was previously cooked by the user and a controlling method thereof.

Additional aspects will be set forth in part in the description which follows and, in part, will be apparent from the description, or may be learned by practice of the presented embodiments.

In accordance with an aspect of the disclosure, a cooking apparatus is provided. The cooking apparatus includes a camera configured to obtain a cooking image by capturing a food product, a sensor configured to detect information associated with cooking while the food product is being captured, a display, a memory, and a processor configured to store information on a cooking history in the memory by matching the cooking image obtained by the camera and information associated with the cooking which is detected through the sensor, control the display to provide a user interface (UI) capable of setting a degree of cooking based on the stored cooking history, obtain control information of the cooking apparatus based on information associated with the cooking which is matched to the cooking image selected on the provided UI, and control the cooking apparatus to perform cooking based on the obtained control information of the cooking apparatus.

The information on the cooking history may include information on a type of the food product included in the captured cooking image, and the processor may be configured to recognize a type of food product located within the cooking apparatus, identify a food product which is matched with the recognized type of the food product from among information on the type of the food product that is included in the information on the cooking history, control, based on a food product which is matched with the recognized type of the food product being identified, the display to provide the UI based on the cooking image which is matched to the identified food product.

The processor may be configured to control, based on a food product which is matched with the recognized type of the food product not being identified, the display to provide the UI based on a cooking image which is included in information on a cooking history of a food product which is similar with the inserted food product or a cooking image on a food product received from an external apparatus.

The cooking image included in the cooking history may be a most recently captured cooking image or a cooking image of which the cooking time was the longest.

The UI may include the captured cooking image, a progress bar capable of adjusting a capturing time point of the cooking image, and a main thumbnail corresponding to a recommended cooking history around the progress bar.

The UI may be configured to sequentially provide a plurality of images corresponding to the recommended cooking history, and information associated with the cooking may be included in the plurality of images.

The cooking apparatus may include a communication interface configured to communicate with an external apparatus, and based on the captured cooking image being a cooking image which is captured less than a threshold degree of cooking, the communication interface may be configured to receive a cooking image which is predicted after the captured cooking image from the external apparatus, and the processor may be configured to control the display to provide the UI based on the captured cooking image and the cooking image which is predicted.

The processor may be configured to recognize a state of the food product located within the cooking apparatus, and obtain, based the recognized state of the food product being different from an initial state of the food product which is included in the captured cooking image, the control information of the cooking apparatus by inputting information on the recognized state of the food product and information associated with the cooking which is matched to the cooking image selected on the provided UI to a trained neural network model.

The processor may be configured to compare information associated with cooking detected while the inserted food product is being cooked with information associated with the cooking which is matched to the cooking image selected on the provided UI, and change the obtained control information of the cooking apparatus.

The processor may be configured to recognize a type of food product located within the cooking apparatus, and obtain, based on the food product in the captured cooking image and the food product located within the cooking apparatus being different foods, the control information of the cooking apparatus for the cooking of an element of a common cooking state to be performed to match a selected degree of cooking.

In accordance with another aspect of the disclosure, a controlling method of a cooking apparatus is provided. The controlling method includes storing information on a cooking history by matching a captured cooking image and information associated with cooking which is detected through a sensor while the cooking image is being captured, providing a UI capable of setting a degree of cooking by using the cooking image stored in the cooking history, obtaining control information of the cooking apparatus based on information associated with the cooking which is matched to the cooking image selected on the provided UI, and controlling the cooking apparatus to perform cooking based the obtained control information of the cooking apparatus.

The information on the cooking history may include information on a type of the food product which is included in the captured cooking image, and the controlling the cooking apparatus may include recognizing a type of food product located within the cooking apparatus, identifying a food product which is matched with the recognized type of the food product from among the information on the type of the food product included in the information on the cooking history, and providing, based on a food product which is matched with the recognized type of the food product being identified, the UI based on the cooking image which is matched to the identified food product.

Based on a food product which is matched with the recognized type of the food product not being identified, providing the UI based on a cooking image included in information on a cooking history of a food product which is similar with the inserted recognized food product or a cooking image on a food product received from an external apparatus may be included.

The cooking image included in the cooking history may be a most recently captured cooking image or a cooking image of which the cooking time was the longest.

The UI may include the captured cooking image, a progress bar capable of adjusting a capturing time point of the cooking image, and a main thumbnail corresponding to a recommended cooking history around the progress bar.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
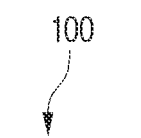
FIG. 1A is a block diagram illustrating a configuration of a cooking apparatus according to an embodiment of the disclosure.
Figure 1A:
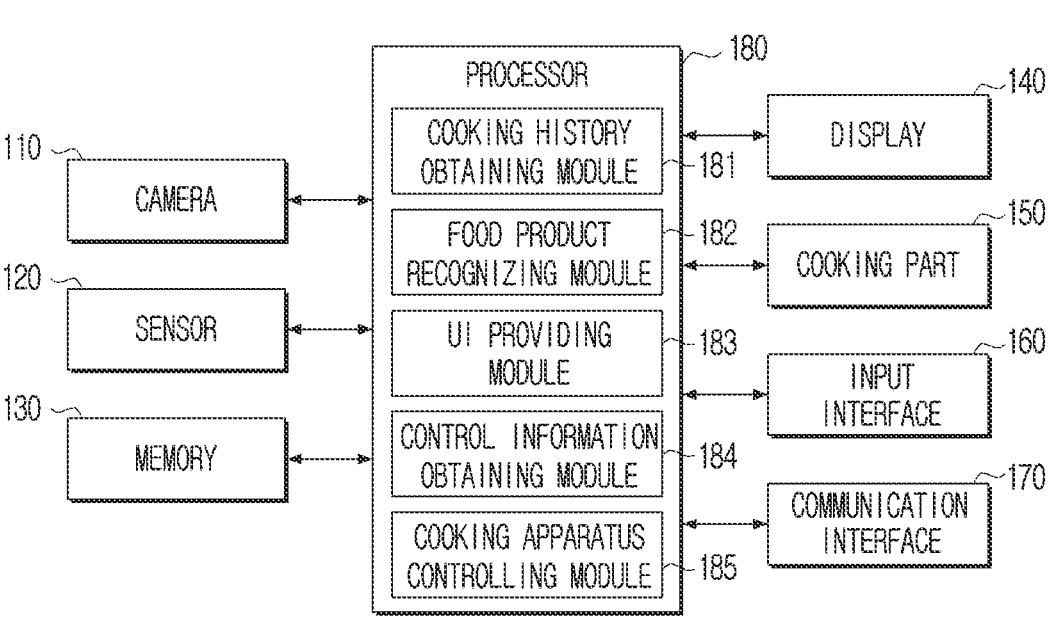

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

The expressions such as "first," "second," "1st," or "2nd" used herein may be used to refer to various elements, regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the other element or as being coupled through other element (e.g., third element). On the other hand, when the certain element (e.g., first element) is indicated as "directly coupled with/to" or "directly connected to" the other element (e.g., second element), it may be understood as the other element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in some circumstances, the expression "a device configured to . . . " may mean something that the device "may perform . . . " together with another device or components. For example, the phrase "a sub-processor configured to (or set up to) perform A, B, and C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The embodiments of the disclosure will be described in detail below with reference to the accompanied drawings.

FIG. 1A is a block diagram illustrating a configuration of a cooking apparatus 100 according to an embodiment of the disclosure.

Referring to FIG. 1A, the cooking apparatus 100 may include a camera 110, a sensor 120, a memory 130, a display 140, a cooking part 150, an input interface 160, a communication interface 170, and a processor 180. At this time, the processor 180 may include a cooking history obtaining module 181, a food product recognizing module 182, a user interface (UI) providing module 183, a control information obtaining module 184, and a cooking apparatus controlling module 185. The cooking apparatus 100 may further include other elements, and at least a part from among the elements of FIG. 1A may be omitted. Here, the cooking apparatus 100 may be an oven or a microwave, but this is merely one embodiment, and may be implemented as an air fryer or other cooking apparatuses.

The camera 110 may be configured to obtain a cooking image by capturing a food product located within the cooking apparatus 100 while the food product is being cooked within the cooking apparatus 100. At this time, the camera 110 may be positioned inside of the cooking apparatus 100 and capture a surface of the food product while the food product is being cooked.

Figure 1B:
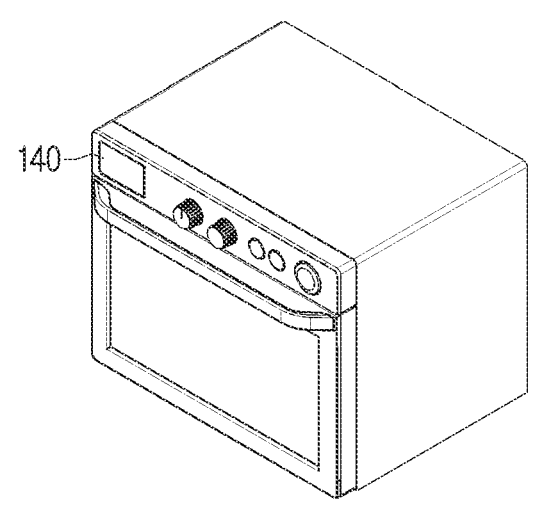
FIG. 1B is a perspective view illustrating an outside and an inside of a cooking apparatus according to an embodiment of the disclosure.
Figure 1B:
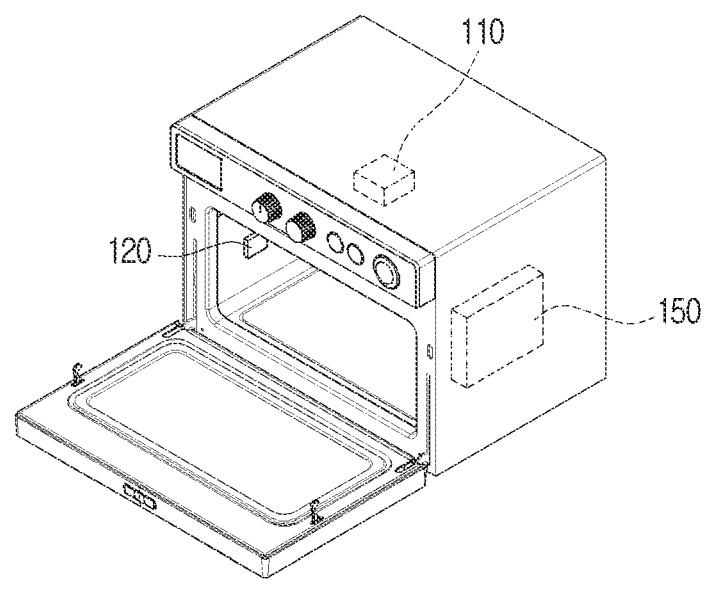

FIG. 1B is a perspective view illustrating an outside and an inside of a cooking apparatus according to an embodiment of the disclosure.

The sensor 120 may be positioned within the cooking apparatus 100 as illustrated in FIG. 1B. The sensor 120 may be configured to detect information associated with cooking while the food product is being captured. The information associated with cooking may include a surface temperature of the food product located within the cooking apparatus 100, a moisture content at a surface of the food product, an internal temperature of the food product, the moisture content inside of the food product, the internal temperature of the cooking apparatus 100, and a humidity of the inside of the cooking apparatus 100. Accordingly, the sensor 120 may include a temperature probe sensor capable of measuring the internal temperature of the food product, a non-contact temperature sensor capable of measuring the surface temperature of the food product, a temperature sensor capable of learning the internal temperature of the cooking apparatus 100, a humidity sensor configured to detect a change in an amount of steam inside the cooking apparatus 100. According to another embodiment, the sensor may be implemented as a weight sensor configured to detect a weight of the food product located within the cooking apparatus 100 or as another sensor same as a smoke detection sensor which is configured to detect smoke generated within the cooking apparatus 100.

The memory 130 may be configured to store information on a cooking history matched with information associated with the cooking which is detected through the captured cooking image and the sensor. Specifically, the information on the cooking history may be information in which the captured cooking image and information associated with the cooking is time synchronized. That is, the information associated with the cooking which is synchronized with a capturing time point of the cooking image may be stored in the memory 130 as information on the cooking history. For example, as the capturing time point of the cooking image is changed from 1 minute to 15 minutes, the surface of the food product with data on a change in internal temperature of the food product and data on a temperature change inside of the cooking apparatus 100 from 1 minute to until 15 minutes may be synchronized with the capturing time point of the cooking image and stored in the memory 130.

The information on the cooking history may further include a control instruction of the user of the cooking apparatus. At this time, the control instruction of the cooking apparatus may include at least one from among a control instruction of the user for temperature adjustment and a control instruction on an operating time of the cooking apparatus 100. In addition, the information on the cooking history may further include type information of the food product and state information of the food product.

The memory 130 may be configured to store at least one instruction for executing the processor 180.

The memory 130 may be implemented as a non-volatile memory, a volatile memory, a flash-memory, a hard disk drive (HDD), a solid state drive (SSD), or the like. The memory 130 may be accessed by the processor 180 and reading/writing/modifying/deleting/updating of data may be performed by the processor 180. In the disclosure, the term 'memory' may include the memory 130, a read only memory (ROM; not shown) in the processor 180, a random access memory (RAM; not shown), or a memory card (not shown; e.g., a micro SD card, a memory stick) mounted to the cooking apparatus 100.

The display 140 may be positioned at an outside of the cooking apparatus 100 as illustrated in FIG. 1B. The display 140 may provide a user interface (UI) through which a degree of cooking may be set by using the cooking image stored in the cooking history. The UI through which the degree of cooking may be set will be described in detail with reference to the drawings.

The display 140 may be implemented as a touch screen together with a touch panel which is included in the input interface 160.

The display 140 may be configured to display other various information. For example, the display 140 may display information on a cooking time, and the like.

The cooking part 150 may be positioned inside the cooking apparatus 100 as illustrated in FIG. 1B. The cooking part 150 may be configured to cook the food product according to a control instruction for cooking which is set together therewith. Specifically, based on the cooking apparatus 100 being an oven or an air fryer, the cooking part may mean a heater heating the inside of the oven or the air fryer.

The input interface 160 may be configured to receive a user input. Specifically, the user input may mean an input for setting the degree of cooking through the UI as an instruction for controlling the cooking apparatus 100.

The control instruction may include at least one from among the control instruction of the user for temperature adjustment and the control instruction on the operating time of the cooking apparatus 100. In addition, the user input may be an input selecting the type and state of the food product located within the cooking apparatus 100.

The input interface 160 may be implemented as a touch screen together with a touch panel of the display and include the display 140 for receiving input of a user touch and a button or a dial for receiving input of a user operation. However, this is merely one embodiment, and the input interface 160 may be implemented to various forms.

The communication interface 170 may be configured to perform communication with an external apparatus. Specifically, the communication interface may be configured to receive information on the cooking history from an external server.

The communication interface may be a configuration configured to perform communication with an external apparatus of various types according to communication methods of various types. The communication interface may include a wireless fidelity (Wi-Fi) module, a Bluetooth module, an infrared communication module, a wireless communication module, and the like. Here, the respective communication modules may be implemented to at least one hardware chip form. The Wi-Fi module and the Bluetooth module may perform communication in a Wi-Fi method and a Bluetooth method, respectively. When using the Wi-Fi module or the Bluetooth module, various connection information such as service set identifier (SSID) and session key may be first transmitted and received, and after communicatively connecting using the above, various information may be transmitted and received.

The processor 180 may be configured to control the overall operation and functions of the cooking apparatus 100. The processor 180 may include a cooking history obtaining module 181, a food product recognizing module 182, a UI providing module 183, a control information obtaining module 184, and a cooking apparatus controlling module 185.

The cooking history obtaining module 181 may match the cooking image obtained by the camera 110 with the information associated with the cooking which is detected through the sensor 120 and obtain information on the cooking history. Specifically, the cooking history obtaining module 181 may time synchronize the captured cooking image and information associated with the cooking, and obtain information of the cooking history. That is, the cooking history obtaining module 181 may synchronize the information associated with cooking which is synchronized with the capturing time point of the cooking image with the cooking image and obtain information on the cooking history. For example, the cooking history obtaining module 181 may synchronize the surface of the food product with the data on the change in internal temperature of the food product and the data on the temperature change inside of the cooking apparatus 100 from 1 minute to until 15 minutes while the capturing time point of the cooking image is changed from 1 minute to 15 minutes, and the information of the cooking history may be obtained.

The food product recognizing module 182 may recognize the type and state of the food product located within the cooking apparatus 100 by using the image of the food product which is captured by the camera 110. Specifically, the type and state of the food product within the cooking apparatus 100 may be recognized by inputting the captured image of the food product to a trained first neural network model. Alternatively, the food product recognizing module 182 may recognize the type and state of the food product located within the cooking apparatus 100 based on a user input selecting the type and state of the food product. The state of the food product may mean whether or not the food product is frozen, the state of the food product, a volume of the food product, and a size of the food product. The trained first neural network model may be a model capable of recognizing the food product with the type and state information by inputting image information of the food product.

For example, the food product recognizing module 182 may recognize that the type of the food product is a chicken, the state of the food product is a frozen state, the weight is 1 kg, and the volume is 1 L by inputting the image of the food product to an artificial intelligence model when the food product is inserted within the cooking apparatus. For example, the food product recognizing module 182 may recognize, based on the user selecting the food located within the cooking apparatus 100 as chicken and defrost through the input interface 160, the type and state of the food located within the cooking apparatus 100 as chicken and defrost.

The UI providing module 183 may provide the UI capable of setting the degree of cooking based on the cooking history by using the cooking image stored in the cooking history. The UI capable of setting the degree of cooking may be described in greater detail below with reference to FIGS. 2 to 7.

The control information obtaining module 184 may be configured to obtain control information of the cooking apparatus to control the cooking apparatus 100 based on information associated with the cooking which is matched with the cooking image selected on the provided UI. The control information of the cooking apparatus may include at least one from among an operating time and an operating temperature of the cooking apparatus 100.

For example, the selected cooking image may be an image of beef cooked to a medium state. The information associated with the cooking which is matched with the selected cooking image may be that an internal temperature of the beef is 40 degree celsius and an external temperature of the beef is 120 degree celsius. At this time, the control information of the cooking apparatus may be information to control the cooking apparatus 100 for the food product to reach a target temperature (internal temperature of 40 degrees, external temperature of 120 degrees).

The control information obtaining module 184 may obtain, based on the recognized state of the food product being different from an initial state of the food product included in the captured cooking image, control information of the cooking apparatus by inputting information on the recognized state of the food product and information associated with the cooking which is matched to the cooking image that is selected on the provided UI to a trained second neural network model. Specifically, the weight of the food product or whether or not it is frozen may vary. That is, the control information obtaining module 184 may be configured to obtain control information of the cooking apparatus so that information associated with the cooking of the inserted food product has a similar value to information associated with the cooking of the food product included in the captured cooking image. Here, the trained second neural network model may be a model capable of obtaining control information for the food product to be cooked to correspond to the information associated with the cooking by inputting information on the state of the food product and information associated with the cooking.

For example, the state of the food product included in the cooking image may be a defrosted state, and the state of the food product located within the cooking apparatus 100 may be a frozen state. The control information obtaining module 184 may be configured to obtain control information of the cooking apparatus so that the surface temperature of the food product and the internal temperature of the food product of the food product included in the cooking image is a match. Specifically, based on the food product in the cooking image being heated for 10 minutes in a state in which the internal temperature is 70 degrees and the surface temperature is 80 degrees, the control information obtaining module 184 may obtain control information of the cooking apparatus for the food product within the cooking apparatus 100 to be cooked so that the cooking time is longer than 10 minutes for the internal temperature to be 70 degrees and the surface temperature to be 80 degrees.

For example, the size of the food product located within the cooking apparatus 100 may be bigger than the size of the food product included in the cooking image. The control information obtaining module 184 may obtain cooking information so that cooking may be carried out to the same degree of cooking by cooking at a relatively higher temperature or cooking longer based on the size of the food product being bigger.

In addition, while the recognized food product is being cooked, the information associated with the detected cooking and the information associated with the cooking which is matched to the cooking image selected on the provided UI may be compared, and the obtained control information of the cooking apparatus may be changed. Specifically, the food product included in the cooking image and the food product inserted within the cooking apparatus may be the same or similar in shape, but there may be a difference in the state of the food product (e.g., thickness of the food product, moisture content of the food product, initial temperature of the food product, ingredient of the food product). The information associated with the cooking which is detected while the food product that is inserted within the cooking apparatus is being cooked may be compared with the information associated with the cooking which is matched to the selected cooking image so that there is no difference in cooking result according to the state of the food product and the obtained control information of the cooking apparatus may be changed.

For example, the control information of the cooking apparatus which is obtained from information associated with the cooking that is matched to the selected cooking image may be maintaining the temperature inside of the cooking apparatus to 200 degrees for 20 minutes. Here, the information associated with the cooking which is included in the selected cooking image may be information for finishing the cooking by cooking 5 minutes longer with the temperature inside of the cooking apparatus being 180 degrees when the inner temperature of the food product is 160 degrees and the external temperature of the food product is 180 degrees. In this case, based on the internal temperature of the food product which is inserted to the cooking apparatus being detected as 160 degrees and the external temperature as 180 degrees, the obtained control information of the cooking apparatus may be changed so that the inside temperature of the cooking apparatus is 180 degrees and that cooking is carried out 5 minutes longer from the time point of reaching the corresponding temperature.

Accordingly, although there is the limitation of some difference occurring with the degree of cooking even if the cooking is carried out according to the obtained control information of the cooking apparatus according to the selected cooking history, the degree of cooking selected by the user may be more accurately realized by changing the control information of the cooking apparatus utilizing the cooking history information which is detected during a cooking process of the food product that is inserted to the cooking apparatus.

Specifically, based on the food product in the captured cooking image and the food product located within the cooking apparatus 100 being different foods, the control information obtaining module 184 may obtain the control information of the cooking apparatus for the cooking apparatus 100 to perform cooking of an element of a common cooking state to match the selected degree of cooking. For example, the element of the common cooking state may include at least one from among a degree of crispiness of the food product, a degree of moisture content, and color. The element of the common cooking state may be defined differently from one another according to a major classification, an intermediate classification, and the like of the food product.

For example, the food product in the cooking image may be a duck meat, and the food product within the cooking apparatus 100 may be a chicken meat. The user may select a cooking image of the duck meat which is cooked to a desired degree of cooking in the cooking image of the duck meat. The control information obtaining module 184 may be configured to obtain the control information of the cooking apparatus so as to cook the chicken meat similarly in crispiness, degree of moisture content, and color with the selected duck meat.

The cooking apparatus 100 may be controlled through the cooking apparatus controlling module 185. The cooking apparatus controlling module 185 may be configured to control the cooking apparatus 100 to perform cooking based on the obtained control information of the cooking apparatus. The control information of the cooking apparatus may include at least one from among a control instruction for adjusting a heating temperature and a control instruction on the operating time of the cooking apparatus 100.

The cooking apparatus controlling module 185 may be configured to control the cooking apparatus 100 so that the cooking apparatus 100 is operated according to the control information of the cooking apparatus.

Figure 2:
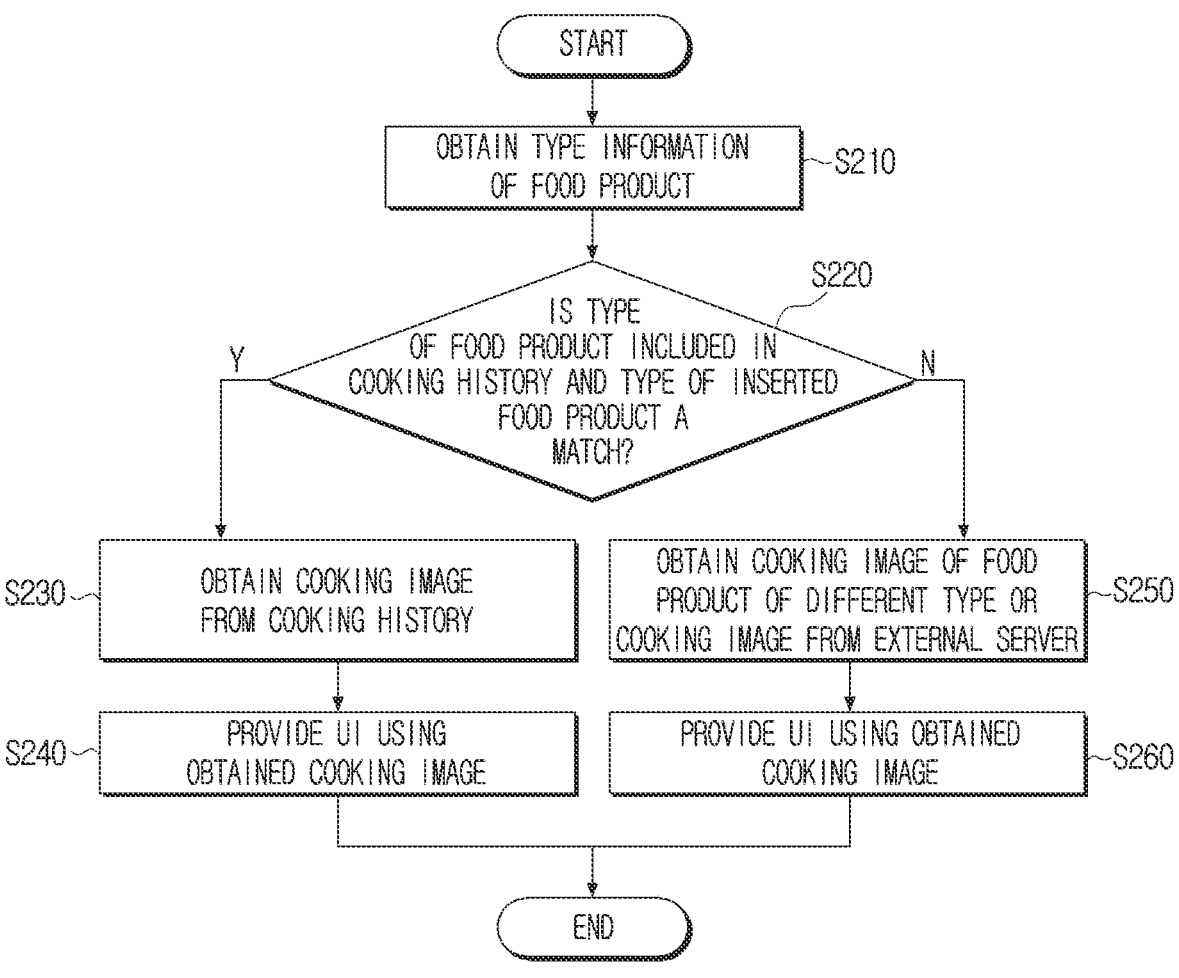
FIG. 2 is a flowchart illustrating a method of obtaining a cooking image based on type information of a food product and providing a user interface (UI) according to an embodiment of the disclosure.

FIG. 2 is a flowchart illustrating a method of obtaining a cooking image based on type information of a food product and providing a UI according to an embodiment of the disclosure.

Referring to FIG. 2, the UI providing module 183 may be configured to obtain the type information of the food product through the food product recognizing module 182 at operation S210.

For example, the UI providing module 183 may be configured to obtain the type information of the food product which includes that the food product is beef from the food product recognizing module 182.

The UI providing module 183 may be configured to identify whether the type information of the food product which is included in the stored cooking history and the type information of the food product located within the cooking apparatus 100 are a match at operation S220. For example, the UI providing module 183 may be configured to identify whether there is a food product that is the same or similar as with the beef which is the type information of the food product included in the cooking history, and whether it is located within the cooking apparatus 100.

Based on identifying that the type information is a match at operation S220-Y, the UI providing module 183 may be configured to obtain the cooking image from the stored cooking history at operation S230. The UI providing module 183 may be configured to provide the UI by using the obtained cooking image at operation S240.

Based on identifying that the type information is not a match at operation S220-N, the UI providing module 183 may be configured to obtain a cooking image from the cooking history on the food product of a similar type with the food product stored in the cooking history or a cooking image from the external apparatus at operation S250. Specifically, the UI providing module 183 may be configured to obtain a cooking image on a food product which is similar with the food product located within the cooking apparatus 100 from among the cooking history stored in the memory 130. Alternatively, the UI providing module 183 may be configured to obtain a cooking image of the food product of the same or similar type with the food product located within the cooking apparatus 100 from the external apparatus. The UI providing module 183 may be configured to obtain the cooking image together with information on the cooking history of the food product in the cooking image. The UI providing module 183 may be configured to provide the UI by using the obtained cooking image at operation S260.

Figure 3:
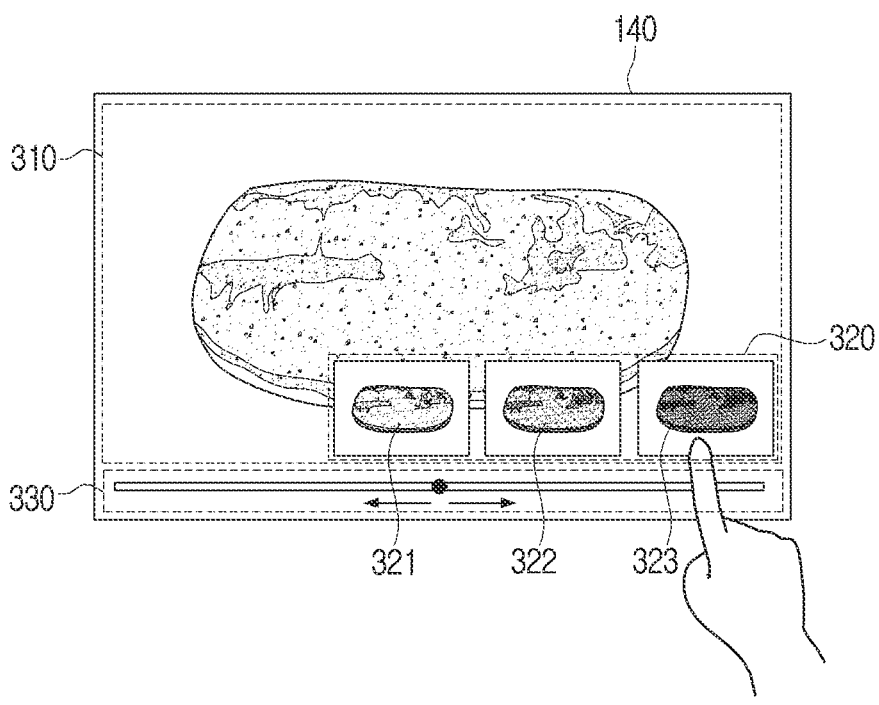
FIG. 3 is a diagram illustrating a UI according to an embodiment of the disclosure.

FIG. 3 is a diagram illustrating a UI according to an embodiment of the disclosure.

The UI may include an image playback area 310, a thumbnail area 320, and a progress bar area 330.

The image playback area 310 may be an area in which a cooking image is played back. The image played back at this time may be a most recently captured cooking image or a cooking image of which the cooking time was the longest.

The cooking image may be a cooking image of a food product corresponding to the type of the food product inserted to the cooking apparatus 100, a cooking image of a food product on a food product of a similar type with the food product inserted to the cooking apparatus 100, or a cooking image of a food product obtained from the external apparatus.

The progress bar area 330 may include a progress bar on the UI. The time point of the cooking image may be moved to a desired time point through scrolling of the progress bar. The progress bar is merely one embodiment, and the user may move the cooking time point by using a dial or a button.

The thumbnail area 320 may be positioned around the progress bar. The thumbnail area 320 may include thumbnails 321, 322 and 323 corresponding to a recommended cooking history. The thumbnails 321, 322 and 323 may be displayed only as an image, or displayed with information on the cooking history around the thumbnails 321, 322 and 323.

For example, a rare, a medium rare, a medium, and a well-done may be displayed over a main thumbnail of beef. A user set cooking temperature, an internal temperature of a food product, and a surface temperature of a food product may be displayed together over the main thumbnail.

A desired degree of cooking may be selected by the thumbnails 321, 322 and 323 being clicked or the cooking image being moved to the desired time point through the progress bar.

The recommended cooking history may be determined by the information stored in the memory 130.

For example, in the case of beef, information associated with cooking to cook to a rare, a medium rare, a medium, and a well-done may be stored in the memory 130. In order to cook the beef to a medium, the beef may be cooked so that the internal temperature reaches 50 to 60° C. The information associated with the cooking to cook according to the degree of cooking may be received from the external apparatus. Using the information stored on the memory 130, the cooking time point corresponding to a rare, a medium rare, a medium, and a well-done on the UI may be used as a recommended cooking history, and the thumbnails 321, 322 and 323 corresponding to the recommended cooking history may be displayed on the UI.

The recommended cooking history may be determined according to a preference input by the user. Specifically, when cooking is finished, the user may input a user preference on a cooking level through the input interface 160. The recommended cooking history may be determined based on the input user preference.

The recommended cooking history may be determined by learning the cooking history of the user. Specifically, the cooking history corresponding to the degree of cooking frequently cooked by the user may be used as the recommended cooking history and a main thumbnail may be displayed on the UI.

Figure 4:
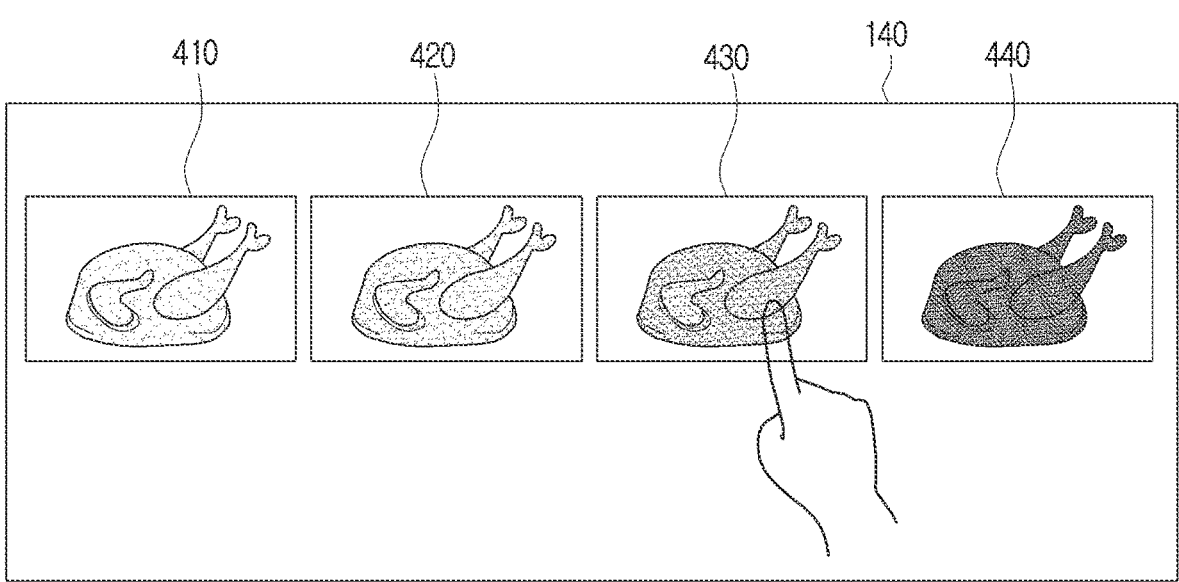
FIG. 4 is a diagram illustrating a UI according to an embodiment of the disclosure.

FIG. 4 is a diagram illustrating a UI according to an embodiment of the disclosure.

For example, the UI may sequentially provide main images 410, 420, 430 and 440 corresponding to the recommended cooking history. The plurality of main images 410, 420, 430 and 440 may be included with information associated with the cooking. The UI may display only the plurality of main images 410, 420, 430 and 440, or information associated with the cooking corresponding to the recommended cooking history may be displayed together therewith.

For example, over the main image of a chicken, a degree of crispiness and information on the cooking temperature may be displayed together over the main image.

The user may select an image with the desired degree of cooking from among a plurality of images.

Figure 5:
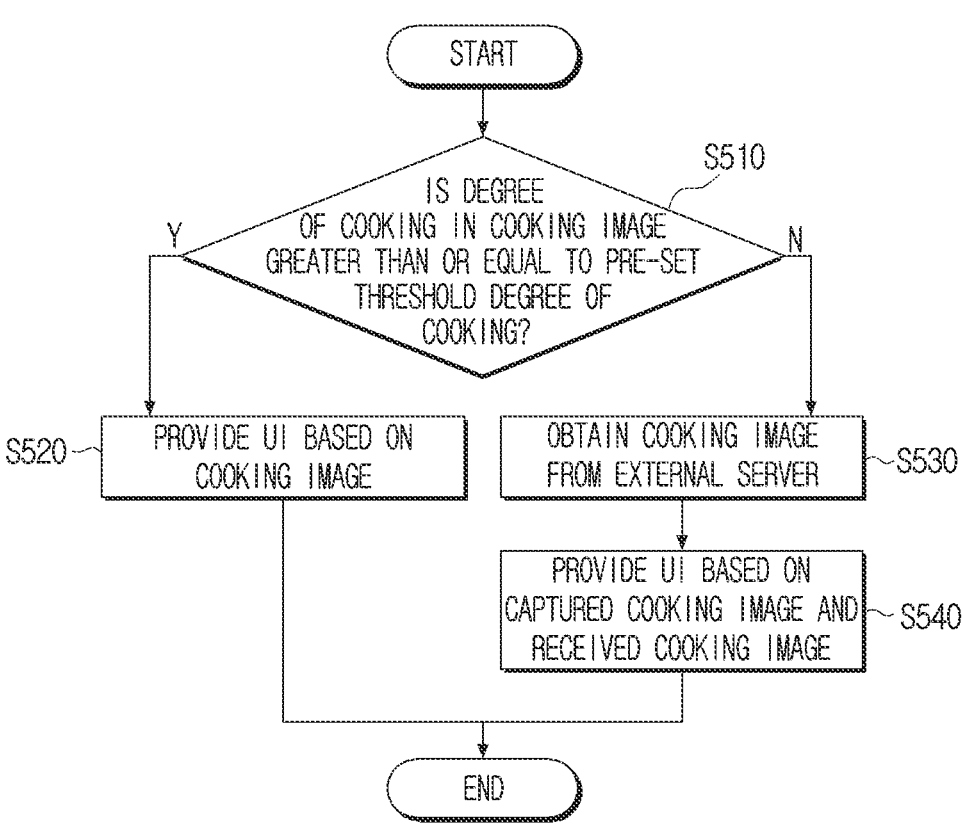
FIG. 5 is a flowchart illustrating a method of providing a UI based on a length of a cooking image according to an embodiment of the disclosure.

FIG. 5 is a flowchart illustrating a method of providing a UI based on a length of a cooking image according to an embodiment of the disclosure.

The UI providing module 183 may identify whether the degree of cooking in the cooking image is greater than or equal to a pre-set threshold degree of cooking (S510). The pre-set threshold degree of cooking may be varied according to the type of the food product. The threshold degree of cooking may be the length of the cooking image, the state of the cooked food product, the internal temperature of the cooked food product, the surface temperature of the cooked food product, the color of the cooked food product, and the degree of crispiness of the cooked food product.

The UI providing module 183 may provide, based on the cooking image being a cooking image which is captured greater than or equal to the threshold degree of cooking at operation S510-Y, the UI based on the cooking image at operation S520. Specifically, based on the degree of cooking in the captured cooking image included in the stored cooking history being greater than or equal to the pre-set threshold degree of cooking, the UI providing module 183 may provide the UI by using the cooking image included in the cooking history.

For example, based on a grilling of the beef in the cooking image being well-done, the internal temperature being greater than or equal to 50 degrees, or the length of the cooking image being greater than or equal to 10 minutes, the UI providing module 183 may determine that the cooking image is an image which is captured greater than or equal to the threshold degree of cooking.

The UI providing module 183 may be configured to obtain, based on the cooking image being a cooking image which is captured less than the threshold degree of cooking at operation S510-N, the cooking image from the external apparatus at operation S530. Specifically, based on the degree of cooking in the captured cooking image included in the stored cooking history being less than the pre-set threshold degree of cooking, the cooking image which is predicted after the captured cooking image may be received from the external apparatus through the communication interface 170. The UI providing module 183 may provide the UI by using the image which sequentially combined the cooking image stored in the memory 130.

For example, based on the length of the captured cooking image included in the stored cooking history being less than a pre-set threshold value and the degree of cooking of beef being a medium, the UI providing module 183 may receive the cooking image predicted with respect to the cooking step after medium from the external apparatus through the communication interface 170. The UI may be provided to the user (at operation S540) by using the beef cooking image which combined the beef cooking image stored in the memory 130 and the beef cooking image received from the external apparatus.

Figure 6:
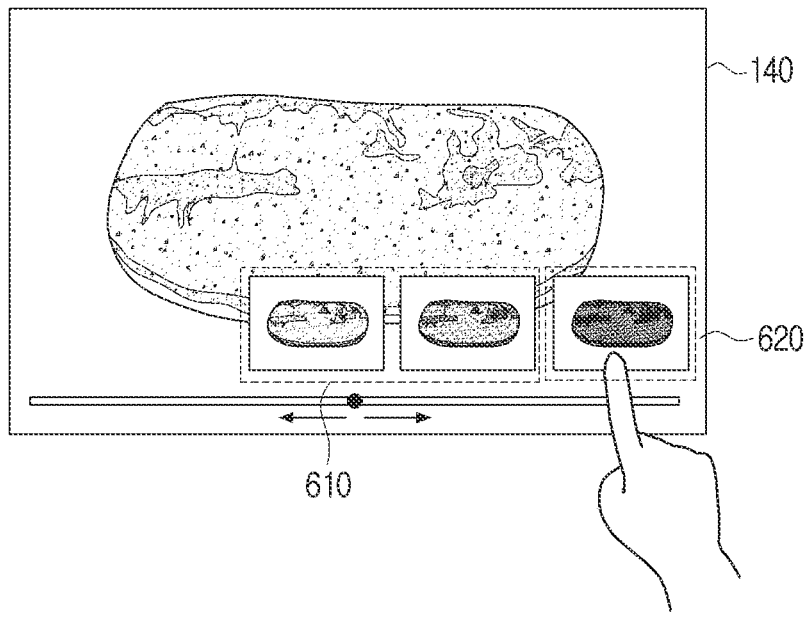
FIG. 6 is a diagram illustrating a method of providing a UI based on a degree of cooking in a cooking image being less than a threshold degree of cooking according to an embodiment of the disclosure.

FIG. 6 is a diagram illustrating a method of providing a UI based on a degree of cooking in a cooking image being less than a threshold degree of cooking according to an embodiment of the disclosure.

The UI providing module 183 may provide, based on the degree of cooking in the cooking image being less than the pre-set threshold degree of cooking, the UI together with the progress bar by combining the cooking image stored in the cooking history and the cooking image received from the external apparatus. The thumbnail may be displayed around the progress bar. The thumbnail may include a thumbnail area 610 created by using the cooking image stored in the cooking history and a thumbnail area 620 created by using the cooking image received from the external apparatus.

For example, the UI providing module 183 may be configured to receive, based on the degree of cooking of beef in the cooking image being a medium, the cooking image in which the degree of cooking of beef is from a medium to a well-done from the external apparatus.

Figure 7:
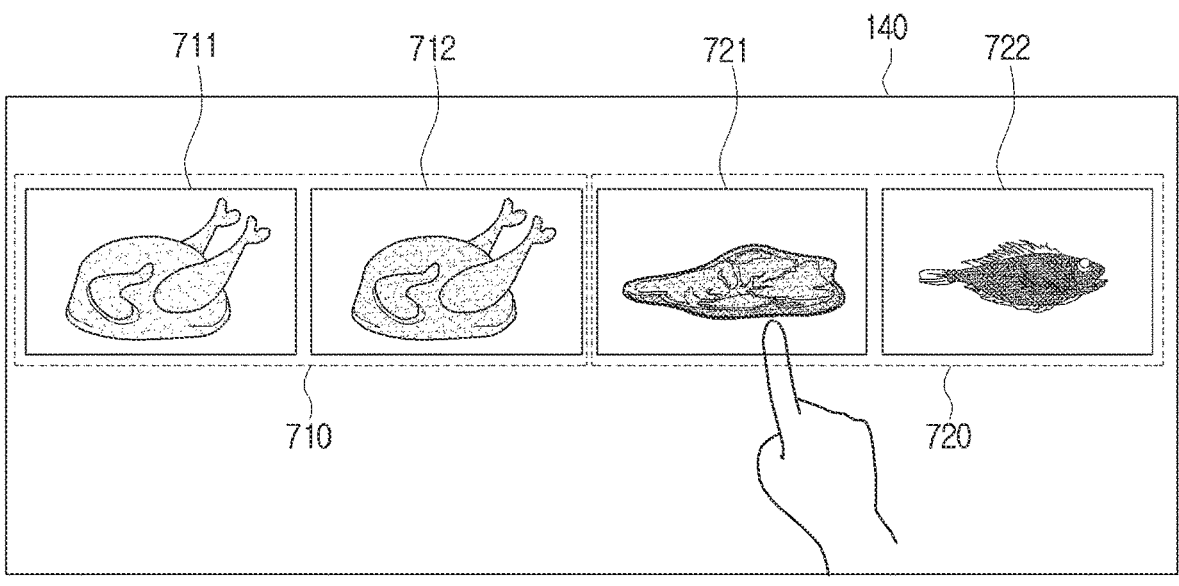
FIG. 7 is a diagram illustrating a method of providing a UI based on a degree of cooking in a cooking image being less than a threshold degree of cooking according to an embodiment of the disclosure.

FIG. 7 is a diagram illustrating a method of providing a UI based on a degree of cooking in a cooking image being less than a threshold degree of cooking according to an embodiment of the disclosure.

The UI providing module 183 may be configured to sequentially provide, based on the degree of cooking in the cooking image being less than the pre-set threshold degree of cooking, main images 711, 712, 721 and 722 by combining the cooking image stored in the cooking history with the cooking image received from the external apparatus.

For example, the UI may include an area 710 for displaying the cooking image stored in the cooking history and an area 720 for displaying the cooking image received from the external apparatus. The main images 711 and 712 generated by using the cooking image stored in the cooking history may be included in the area 710 which displays the cooking image stored in the cooking history. The main images 721 and 722 generated by using the cooking image received from the external apparatus may be included in the area 720 which displays the cooking image received from the external apparatus.

Based on the cooking image received from the external apparatus being a cooking image of a food product which is similar with the food product located within the cooking apparatus 100, the main images 711 and 712 may be images generated by using the cooking image of the food product which is similar with the food product located within the cooking apparatus 100. Alternatively, based on the cooking image received from the external apparatus being a cooking image of a food product which is the same as with the food product located within the cooking apparatus 100, the main images 711 and 712 may be images generated by using the cooking image of the food product which is the same as with the food product located within the cooking apparatus 100.

Figure 8:
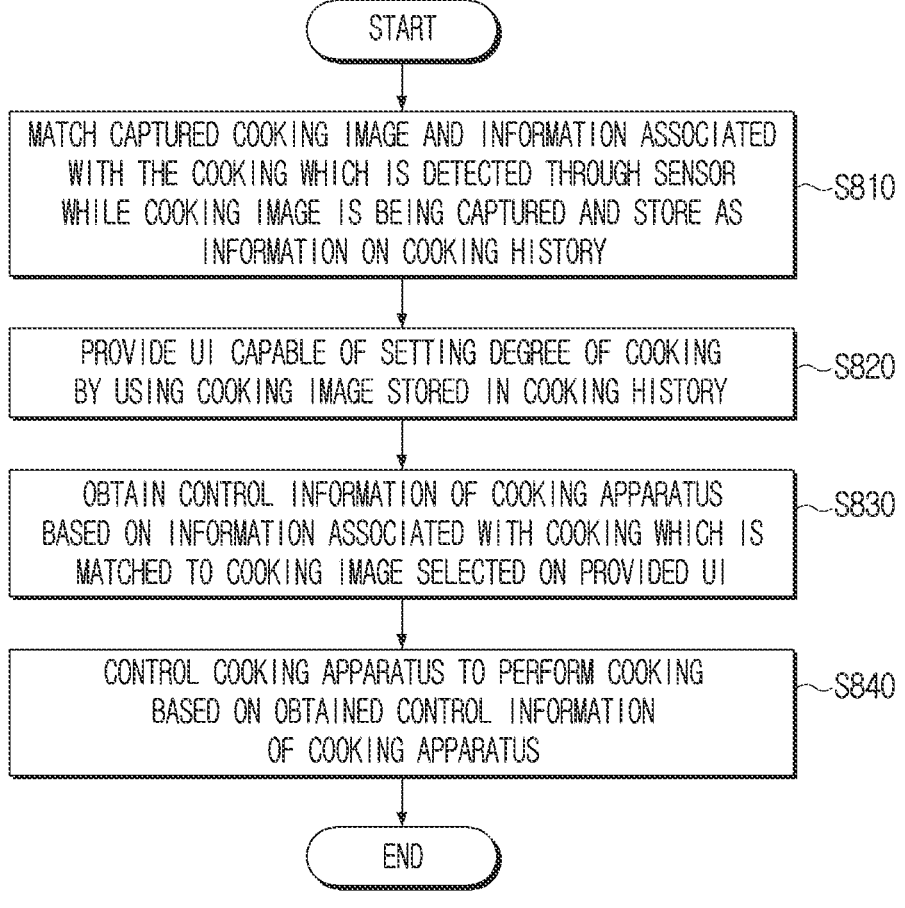
FIG. 8 is a flowchart illustrating a controlling method of a cooking apparatus according to an embodiment of the disclosure.

FIG. 8 is a flowchart illustrating a controlling method of a cooking apparatus according to an embodiment of the disclosure.

By matching the captured cooking image and information associated with the cooking which is detected through the sensor 120 while the cooking image is being captured, it may be stored as information on the cooking history at operation S810. Here, the information on the cooking history may include information on the type of the food product which is included in the captured cooking image. The cooking image included in the cooking history may be the most recently captured cooking image or the cooking image of which the cooking time was the longest.

The UI capable of setting the degree of cooking may be provided by using the cooking image stored in the cooking history at operation S820. Here, the UI may include the captured cooking image, the progress bar capable of adjusting the capturing time point of the cooking image, and the main thumbnail corresponding to the recommended cooking history around the progress bar. In addition, the UI may sequentially provide the plurality of images corresponding to the recommended cooking history, and information associated with the cooking may be included in the plurality of images.

Here, the type of the food product located within the cooking apparatus 100 may be recognized, and based on a food product which is matched with the recognized type of the food product being identified, the UI may be provided based on the cooking image which is matched to the identified food product.

Further, based on the type of the food product located within the cooking apparatus 100 being recognized and a food product which is matched with the recognized type of the food product not being identified, the UI may be provided based on a cooking image included in a cooking history of a food product which is similar with the recognized food product or a cooking image on a food product received from the external apparatus.

In addition, based on the captured cooking image being a cooking image captured less than the threshold degree of cooking, the UI may be provided based on the predicted cooking image by receiving the predicted cooking image after the captured cooking image from an external device.

The control information of the cooking apparatus may be obtained based on the information associated with the cooking which is matched to the cooking image selected on the provided UI at operation S830. Here, based on the state of the food product located within the cooking apparatus 100 being recognized, and the recognized state of the food product being different from the initial state of the food product which is included in the captured cooking image, the control information of the cooking apparatus 100 may be obtained by inputting the information on the recognized state of the food product and the information associated with the cooking which is matched to the cooking image selected on the provided UI to the trained second neural network model. In addition, based on the type of the food product located within the cooking apparatus 100 being recognized, and the food product in the captured cooking image and the food product located within the cooking apparatus 100 being different foods, the control information of the cooking apparatus may be obtained for the cooking of the element of the common cooking state to be performed to match the selected degree of cooking.

The cooking apparatus 100 may be controlled to perform cooking based on the obtained control information of the cooking apparatus at operation S840.

Figure 9:
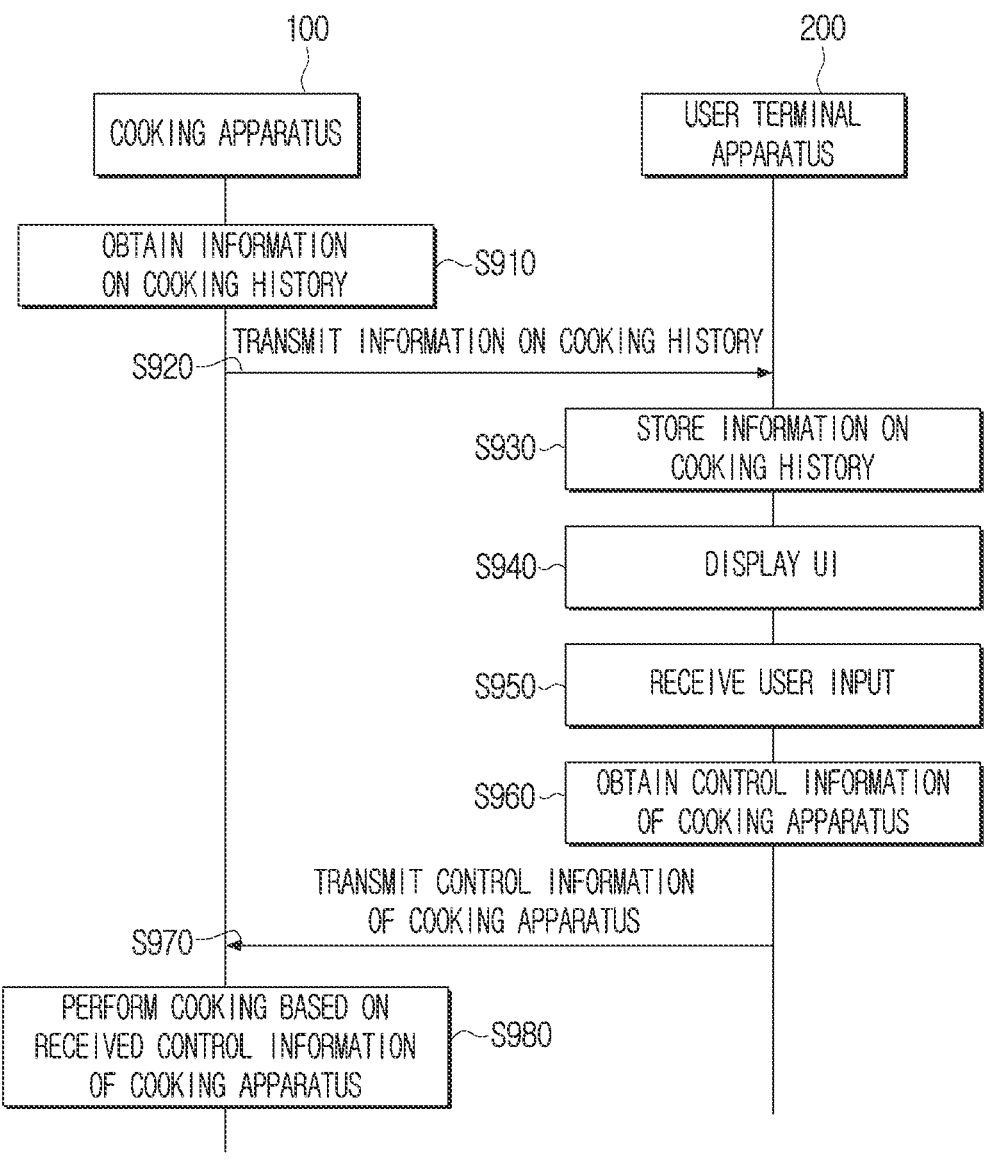
FIG. 9 is a sequence diagram illustrating an embodiment of controlling a cooking apparatus by utilizing a user terminal apparatus according to an embodiment of the disclosure.

FIG. 9 is a diagram illustrating an embodiment of controlling the cooking apparatus 100 by using a user terminal apparatus according to an embodiment of the disclosure.

The cooking apparatus 100 may be configured to obtain the information on the cooking history by matching the captured cooking image and the information associated with the cooking which is detected through the sensor while the cooking image is being captured at operation S910. Here, the information on the cooking history may include information on the type of the food product included in the captured cooking image. The cooking image included in the cooking history may be the most recently captured cooking image or the cooking image of which the cooking time was the longest.

The cooking apparatus 100 may be configured to transmit the information on the cooking history to the user terminal apparatus 200 at operation S920. Here, the cooking apparatus 100 may be configured to transmit the information on the cooking history to the user terminal apparatus 200 through the communication interface.

The user terminal apparatus 200 may be configured to store the received information on the cooking history in the memory at operation S930.

The user terminal apparatus 200 may be configured to display the UI through the display by using the cooking image included in the received information on the cooking history at operation S940. Here, the UI may include the captured cooking image, the progress bar capable of adjusting the capturing time point of the cooking image, and the main thumbnail corresponding to the recommended cooking history around the progress bar. In addition, the UI may be configured to sequentially provide the plurality of images corresponding to the recommended cooking history, and information associated with the cooking may be included in the plurality of images.

Here, based on the type of the food product located within the cooking apparatus 100 being recognized and a food product which is matched with the recognized type of the food product being identified, the UI may be provided based on the cooking image which is matched to the identified food product.

Further, based on the type of the food product located within the cooking apparatus 100 being recognized and the food product which is matched with the recognized type of the food product not being identified, the UI may be provided based on a cooking image included in a cooking history of a food product which is similar with the recognized food product or a cooking image on a food product received from the external apparatus.

In addition, based on the captured cooking image being a cooking image which is captured less than the threshold degree of cooking, the UI may be provided based on receiving the cooking image which is predicted after the captured cooking image from the external apparatus, the captured cooking image, and the cooking image which is predicted.

The user terminal apparatus 200 may be configured to receive the user input through the input interface at operation S950. The input interface of the user terminal apparatus 200 may be implemented with a touch display including a touch panel or a button.

The user terminal apparatus 200 may be configured to obtain the control information of the cooking apparatus at operation S960. Specifically, the user terminal apparatus 200 may be configured to obtain the control information of the cooking apparatus based on the information associated with the cooking which is matched to the cooking image selected on the provided UI. Here, based on the state of the food product located within the cooking apparatus 100 being recognized, and the recognized state of the food product being different from the initial state of the food product which is included in the captured cooking image, the control information of the cooking apparatus 100 may be obtained by inputting the information on the recognized state of the food product and the information associated with the cooking which is matched to the cooking image selected on the provided UI to the trained second neural network model. In addition, based on the type of the food product located within the cooking apparatus 100 being recognized, and the food product in the captured cooking image and the food product located within the cooking apparatus 100 being different foods, the control information of the cooking apparatus may be obtained for the cooking of the element of the common cooking state to be performed to match the selected degree of cooking.

The user terminal apparatus 200 may be configured to transmit the obtained control information of the cooking apparatus to the cooking apparatus 100 through the communication interface at operation S970.

The cooking apparatus 100 may be configured to perform cooking based on the received control information of the cooking apparatus at operation S980.

The terms "part" or "module" used in the disclosure may include a unit configured as a hardware, a software, or a firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be configured as an application-specific integrated circuit (ASIC).

The various embodiments of the disclosure may be implemented with software including instructions stored in a machine-readable storage media (e.g., computer). The machine may call a stored instruction from the storage medium, and as a device capable of operating according to the called instruction, may include an electronic apparatus (e.g., cooking apparatus 100) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

According to an embodiment, a method according to the various embodiments described herein may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE). In the case of online distribution, at least a portion of the computer program product may be at least stored temporarily in a storage medium such as a server of a manufacturer, a server of an application store, or a memory of a relay server, or temporarily generated.

Respective elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cooking apparatus, comprising:
a camera configured to capture a cooking image of a food product:
a sensor configured to detect information associated with cooking while the food product is being captured, the sensor including a temperature probe sensor configured to measure an internal temperature of the food product and a non-contact temperature sensor configured to measure a surface temperature of the food product;
a display;
a memory, comprising one or more storage media, storing instructions; and
one or more processors communicatively coupled to the sensor, the display, and the memory,
wherein the instructions, when executed by the one or more processors individually or collectively, cause the cooking apparatus to:
store information on a cooking history in the memory by matching the cooking image obtained by the camera and information associated with the cooking which is detected through the sensor, the information on the cooking history including information on the internal temperature of the food product and the surface temperature of the food product,
control the display to provide a user interface (UI) capable of setting a degree of cooking based on the stored cooking history information,
obtain control information of the cooking apparatus based on information associated with the cooking which is matched to the cooking image selected on the provided UI, and
control the cooking apparatus to perform cooking based on the obtained control information of the cooking apparatus.

2. The cooking apparatus of claim 1,
wherein the information on the cooking history comprises information on a type of the food product comprised in the captured cooking image, and
wherein the instructions, when executed by the one or more processors individually or collectively, further cause the cooking apparatus to:
recognize a type of food product inserted in the cooking apparatus,
identify a food product which is matched with the recognized type of the food product from among information on the type of the food product that is comprised in the information on the cooking history, and
control, based on a food product which is matched with the recognized type of the food product being identified, the display to provide the UI based on the cooking image which is matched to the identified food product.

3. The cooking apparatus of claim 2, wherein the instructions, when executed by the one or more processors individually or collectively, further cause the cooking apparatus to control, based on a food product which is matched with the recognized type of the food product not being identified, the display to provide the UI based on a cooking image which is comprised in information on a cooking history of a food product which is similar with the inserted food product or a cooking image on a food product received from an external apparatus.

4. The cooking apparatus of claim 1, wherein the cooking image comprised in the cooking history is a most recently captured cooking image or a cooking image of which a cooking time was longest.

5. The cooking apparatus of claim 1, wherein the UI comprises the captured cooking image, a progress bar capable of adjusting a capturing time point of the cooking image, and a main thumbnail corresponding to a recommended cooking history around the progress bar.

6. The cooking apparatus of claim 1, wherein the UI is configured to sequentially provide a plurality of images corresponding to a recommended cooking history, and information associated with the cooking is comprised in the plurality of images.

7. The cooking apparatus of claim 1, wherein the cooking apparatus comprises a communication interface configured to communicate with an external apparatus, wherein, based on the captured cooking image being a cooking image which is captured less than a threshold degree of cooking, the communication interface is configured to receive a cooking image which is predicted after the captured cooking image from the external apparatus, and wherein the instructions, when executed by the one or more processors individually or collectively, further cause the cooking apparatus to control the display to provide the UI based on the captured cooking image and the cooking image which is predicted.

8. The cooking apparatus of claim 1, wherein the instructions, when executed by the one or more processors individually or collectively, further cause the cooking apparatus to:

recognize a state of a food product inserted to the cooking apparatus; and obtain, based the recognized state of the food product being different from an initial state of the food product which is comprised in the captured cooking image, the control information of the cooking apparatus by inputting information on the recognized state of the food product and information associated with the cooking which is matched to the cooking image selected on the provided UI to a trained neural network model.

9. The cooking apparatus of claim 8, wherein the instructions, when executed by the one or more processors individually or collectively, further cause the cooking apparatus to:

compare information associated with cooking detected while the inserted food product is being cooked with information associated with the cooking which is matched to the cooking image selected on the provided UI; and change the obtained control information of the cooking apparatus.

10. The cooking apparatus of claim 1, wherein the instructions, when executed by the one or more processors individually or collectively, further cause the cooking apparatus to:

recognize a type of food product inserted to the cooking apparatus; and obtain, based on the food product in the captured cooking image and the food product inserted to the cooking apparatus being different foods, the control information of the cooking apparatus for cooking of an element of a common cooking state to be performed to match a selected degree of cooking.

11. A controlling method of a cooking apparatus, the controlling method comprising:

storing information on a cooking history by matching a captured cooking image of a food product and information associated with cooking which is detected through a sensor while the cooking image is being captured, the sensor including a temperature probe sensor configured to measure an internal temperature of the food product and a non-contact temperature sensor configured to measure a surface temperature of the food product;

providing a user interface (UI) capable of setting a degree of cooking by using the cooking image stored in the cooking history, the information on the cooking history including information on the internal temperature of the food product and the surface temperature of the food product;

obtaining control information of the cooking apparatus based on information associated with the cooking which is matched to the cooking image selected on the provided UI; and controlling the cooking apparatus to perform cooking based the obtained control information of the cooking apparatus.

12. The method of claim 11, wherein the information on the cooking history comprises information on a type of the food product which is comprised in the captured cooking image, and wherein the controlling the cooking apparatus comprises:

recognizing a type of food product inserted to the cooking apparatus, identifying a food product which is matched with the recognized type of the food product from among the information on the type of the food product comprised in the information on the cooking history, and providing, based on a food product which is matched with the recognized type of the food product being identified, the UI based on the cooking image which is matched to the identified food product.

13. The method of claim 12, comprising:

providing, based on a food product which is matched with the recognized type of food product not being identified, the UI based on a cooking image comprised in information on a cooking history of a food product which is similar with the inserted food product or a cooking image on a food product received from an external apparatus.

14. The method of claim 11, wherein the cooking image comprised in the cooking history is a most recently captured cooking image or a cooking image of which a cooking time was longest.

15. The method of claim 11, wherein the UI comprises:

the captured cooking image, a progress bar capable of adjusting a capturing time point of the cooking image, and a main thumbnail corresponding to a recommended cooking history around the progress bar.

16. The cooking apparatus of claim 8, wherein the state of the food product includes a frozen state.

* * * * *